May 19, 1936.  H. E. COLLINS  2,041,232
HOLDER FOR SNELLED FISHING HOOKS
Filed Feb. 23, 1935
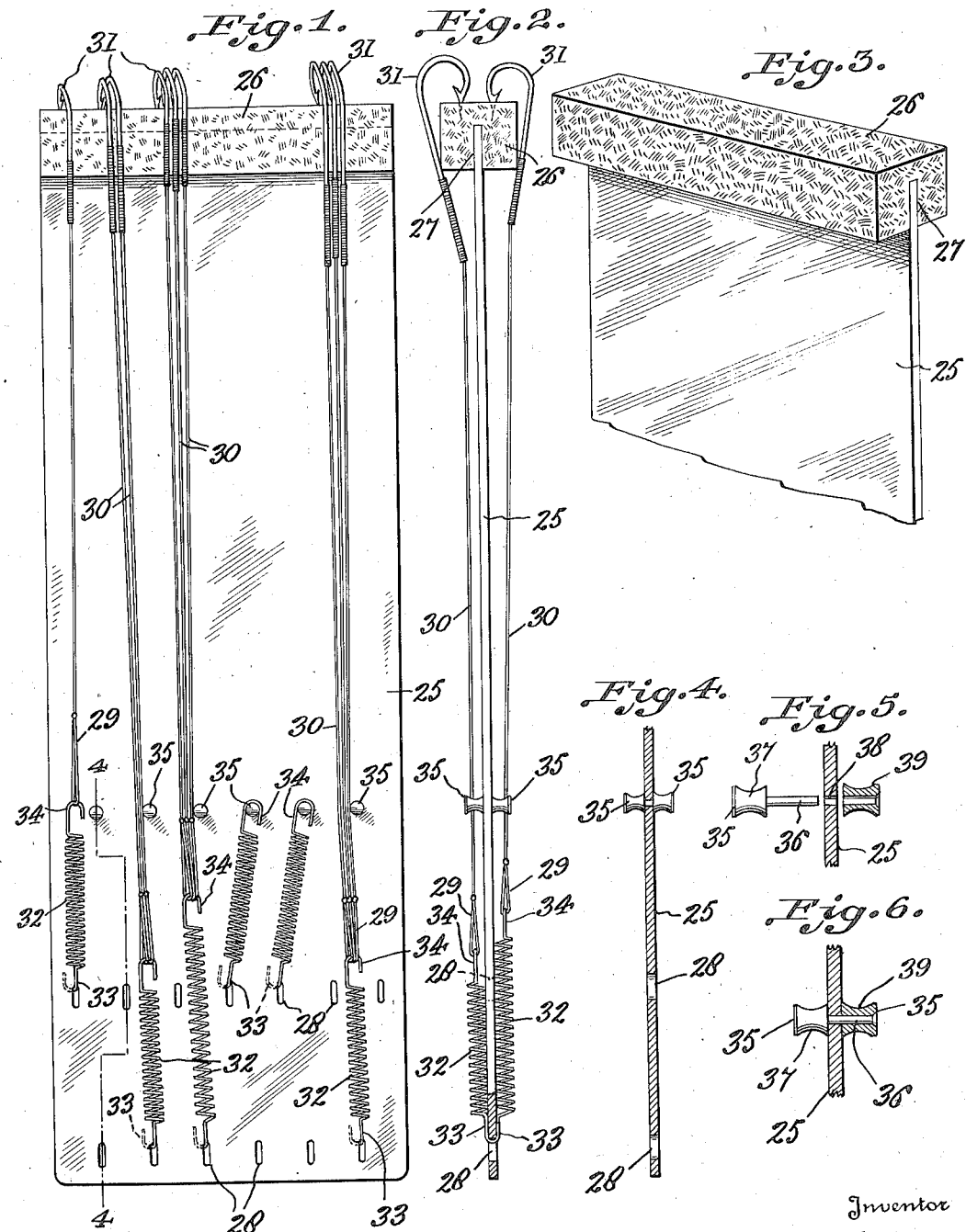
Inventor
Henry E. Collins Patented May 19, 1936

2,041,232

UNITED STATES PATENT OFFICE 2,041,232

HOLDER FOR SNELLED FISHING HOOKS

Henry E. Collins, Dunmore, Pa.

Application February 23, 1935, Serial No. 7,916

7 Claims. (Cl. 43—32)

The present invention relates to fishing tackle and the like, and more particularly to a holder for snelled fish hooks.

In a fishing kit or supply box one keeps numerous objects including fish hooks of various sizes and types, and to prevent injury to the user and to prevent the hooks becoming entangled with one another and with the lines and other accessories, the present invention provides an improved snelled fish hook holder.

The holder of this invention also accommodates, in a small space, a large number of fish hooks of various sizes and with snells or guts of various lengths and admits easy access to the holder and to the hooks; holds the snells taut; eliminates all dangling, loose and exposed hook parts; and provides spring or tension devices which are of uniform size and length, which may accommodate each one or more hook snells and which are individually adjustable on the holder to provide the required tension on the snells and to accommodate snells of different lengths.

Another object of this invention is to provide a hook guard and support which may be of suitable spongy or like material within which the points of the hooks may be embedded, and which is so mounted upon the device or holder that hooks of various sizes may be mounted on the holder from opposite sides thereof, the holder being mounted on one end of the device so that the hooks may extend to a considerable extent across the spongy head from one side toward the other.

A further object is to provide a holder with a plurality of separate tension hook devices and means for supporting the devices out of the way and from dangling when not in use, and to provide on the holder cooperating means for the tension devices for securing the same at different distances from the head piece of the holder depending upon the different lengths of the snells to maintain the same taut on the holder.

Another object of the present invention is to provide holding means for the tension devices to secure them on the holder in positions which will be out of the way of the snells of the hooks and of other tension devices which are being used, and which are so disposed that the tension devices may be quickly and easily removed and adjusted when required for engagement with the snells of fishing hooks.

With the foregoing and other objects in view, the invention will be more fully described hereinafter, and will be more particularly pointed out in the claims appended thereto.

In the drawing, wherein like symbols refer to like or corresponding parts throughout the several views, Figure 1 is a side elevation of a holder for snelled fishing hooks embodying the features of this invention and showing a plurality of different sized fish hooks thereon with snells of different lengths secured singly and in groups on the holder.

Figure 2 is an edge elevation of the same, the lower end of the holder being shown in section.

Figure 3 is a fragmentary upper end perspective view of the holder with the fish hooks removed and showing the head piece mounted on the body plate of the holder.

Figure 4 is a fragmentary enlarged sectional view taken through the lower end of the holder substantially on the line 4—4 of Figure 1.

Figure 5 is an enlarged fragmentary sectional view taken through the body plate, showing one of the tension device holding posts removed and ready for attachment to the plate, and Figure 6 is a similar view showing the post in position as an integral portion of the plate projecting from opposite sides thereof.

Referring now to the drawing, the holder comprises a body plate 25 which may be of any suitable material, such as aluminum, and is of a suitable practical width for accommodating a desired number of hooks and is also of sufficient length to take care of the snells of the hooks and the tension devices therefor when the hooks are mounted on the device. The body plate 25 is provided on one end, which may be referred to as the top of the holder, with a head piece 26 of spongy rubber or other suitable material in the form of a block which may be of the width of the body plate 25, and which is provided at its inner or lower side with a longitudinal slot 27 for the reception of the adjacent end of the plate 25 therein. Cement or the like is used for holding the head piece 26 to the plate 25. The outer face of the head piece 26 is relatively smooth and uninterrupted and extends from side to side of the holder, and the block 26 may be of any suitable practical width to accommodate small and large hooks.

At the opposite or lower end, the body plate 25 is provided with two or more rows of lengthwise extending slots 28, the rows of slots extending from one lateral edge to the other of the body plate and being suitably spaced apart for receiving the lower ends of tension devices which are selectively engaged in the slots 28 and which at their other ends are adapted for engagement with loops 29 of the snells 30 upon which the fishing hooks 31 are mounted.

It is preferable to dispose the rows of slots 28 not only in spaced relation relatively to the length of the body plate 25, but to also dispose the slots into spaced rows in staggered or offset relation so that the tension devices connected in the lower slots will not obstruct the tension devices engaging in the upper slots. These tension devices may comprise, as shown, coil springs 32 of suitable width and size and which are provided at their lower ends with slot engaging hooks 33 having their shanks offset toward the side of the spring 32 and with the bills of the hooks 33 extending outwardly from the axes of the springs. This construction of hook 33 is such that the hook with its shank lies flat against the face of the plate 25 and the spring 32 is free to lie flat throughout its length against the same side of the plate 25 and in position of easy access for manipulation in engaging the snells of the fish hooks. The upper end of each spring 32 is provided with a hook 34. The hook 34 is preferably disposed at right angles to the hook 33 and in coaxial alinement with the spring 32 so that the force exerted upon the hook 34 will be coaxial of the spring and tend to hold the latter not only in line with the snell 30 but also flat against the body plate 25 and between the slots 28 of the upper row.

The plate 25 is provided, above the upper row of slots 28, with a row of posts 35 which project from opposite sides of the plate 25 and which are spaced above the upper slots 28 a distance sufficient to place the springs 32 under tension when engaging at their lower ends the slots 28 and at their upper ends the posts 25.

As shown in Figures 5 and 6, each post may comprise a stem 36 having a fixed head 37 on one end adapted to engage against one side of the body plate 25 and with the stem extending through an opening 38 provided in the plate 25. A separate head 39 is mounted over the projecting end of the stem 36 at the opposite side of the body plate and engages said opposite side of the body plate and is held in place by swaging or riveting the end of the stem 36 against the outer end of the removable head 39. Thus, the post is provided with the heads 37 and 39 at opposite sides of the body plate 25 and the posts are substantially integrally connected with the plate. The heads 37 and 39 may be circumferentially grooved to receive the hooks 34 of the tension devices and hold them from sliding outwardly from the posts.

In use, the fish hooks 31 are mounted on the holder at opposite sides thereof so that the holder may accommodate a relatively large number of hooks within the confines of its dimensions.

In applying a hook 31, the same is engaged against one side of the head piece 26 with the point or prong of the hook overhanging the head piece when the hook is then forced downwardly to embed the point of the hook in the spongy material of the head piece. It is apparent that large hooks will extend beyond the plane of the body plate 25 toward the opposite side of the holder and that smaller hooks will not extend so far over the head piece. The head piece is relatively broad and uninterrupted so that hooks of various sizes may be readily applied thereto.

After the hook has been engaged with the head piece, the snell 30 of the hook is extended downwardly along the side of the body plate and one of the tension devices or springs 32 is engaged by its hook 34 in the loop 29 of the snell and the lower hook 33 of the spring is then selectively engaged in an opening 28 of either the upper or lower row of openings, depending upon the length of the snell 30 of the fish hook. The spring 32 thus is held at one end to the plate and at the other end to the snell of the fish hook and exerts a continuous pull upon the snell to hold it taut and flat against the side of the body plate 25.

As shown in Figure 1, a number of snells 30 of fish hooks may be engaged upon one tension device by having the loops 29 of the snells engaged with a single hook 34. This arrangement is had where the snells 30 are of the same length.

When the tension devices or springs 32 are not in use, they are engaged by their lower hooks 33 through the upper slots 28 of the body plate and their upper hooks 34 are detachably engaged over the posts 35. Thus, a number of the springs 32 may be carried upon each side of the holder and may be quickly and easily released from the posts 35 and connected to the snells and adjusted in the desired slots 28.

All of the springs are thus held from dangling from the holder so that they cannot easily become entangled with fishing lines and the like which may be placed in a fishing kit.

The posts 35 may also be used for steadying the snells 30 of the fishing hooks as shown in Figure 1 where the posts 35 may be positioned in line with the lower slots 28 so as to engage and partly deflect the snells 30 when tensioned by the springs 32.

What is claimed is:—

1. A holder for snelled fishing hooks, comprising a body plate, a spongy head piece mounted on one end of the plate and extending beyond the opposite sides thereof for receiving therein the points of fish hooks at opposite sides of the plate, said plate having at its other end spaced transverse rows of slots opening through the opposite sides of the plate and having a plurality of posts spaced from the slots and extending from opposite sides of the plate, and a plurality of springs having hooks on one end to selectively engage in the slots and having hooks on their opposite ends to selectively engage the snells of the fishing hooks to hold the same taut against the side of the plate and to engage the posts to hold the springs from dangling when disengaged from the said snells.

2. A holder for snelled fishing hooks, comprising a body plate, a head piece mounted on one end of the body plate for receiving fish hooks, a plurality of springs having hooks on opposite ends, said springs being adapted to be engaged at one end with the snells of fishing hooks, said plate having spring receiving means at its opposite end for holding the springs under tension to maintain said snells taut, and posts having stems extending through said plate at points spaced from said means and provided with heads on opposite ends of the post projecting from opposite sides of the plate for receiving thereon the hooks on said first ends of the springs when released from the snells to maintain the springs under tension against the sides of the plate when not in use.

3. A holder for snelled fishing hooks, comprising a body plate, a spongy head piece on one end of the body plate for receiving the ends of fishing hooks therein, a plurality of tension devices removably engageable with the snells of the fishing hooks and having anchoring hooks at their free ends, said body plate having transversely disposed rows of longitudinal slots therein for the reception of said anchoring hooks through the body plate to hold the tension devices thereto and yieldingly bind the hooks in the head piece, and said rows of slots being spaced apart lengthwise of the plate for selectively holding the tension devices at different distances from said spongy head piece to accommodate snells of different lengths, and holding means on the body plate spaced from said slots for engagement with said tension devices when freed from the snells of the hooks to hold the tension devices from dangling from the plate.

4. A holder for snelled fishing hooks, comprising a flat body plate, a spongy head piece secured across and exposed at one end of the plate for receiving therein the points of fishing hooks from either side of the plate, and a plurality of springs detachably engageable with the snells of the fishing hooks, said plate having spaced spring end engaging slots for selectively engaging the springs to hold the same and the snells taut at either side of the plate and to yieldingly hold the fishing hooks to the spongy head piece, said plate also having integral spring end receiving means spaced from the slots to receive the other ends of the springs when disengaged from the said snells to hold the springs flat against the sides of the plate.

5. A holder for snelled fishing hooks, comprising a flat body plate, a spongy head piece mounted across and exposed at one end of the body plate to receive the points of fishing hooks at opposite sides of the plate, a plurality of springs having hooks on opposite ends, the hooks on one end of the springs being adapted for detachable engagement with the snells of the fishing hooks, said plate having transverse spaced rows of slots therethrough for selectively receiving the hooks at the other ends of the springs depending on the lengths of the snells to hold the said snells taut at the sides of the plate and yieldingly bind the fishing hooks in the spongy head piece, and means integral with the plate and projecting from opposite sides thereof for receiving the said first hooks of the springs when removed from said snells to hold the springs taut and from dangling from the plate when the springs are not in use.

6. A holder for snelled fishing hooks comprising a body plate, a spongy head piece on one end of the body plate for receiving the ends of fishing hooks therein, a plurality of tension devices removably engageable with the snells of the fishing hooks and having anchoring hooks at their opposite ends, the anchoring hooks at one end of the tension devices being adapted for detachable engagement with the snells of the fishing hooks, said body plate having transversely disposed rows of longitudinal slots therein for the reception of the anchoring hooks at the other ends of the tension devices through the body plate to hold the tension devices thereto, said rows of slots being spaced apart lengthwise of the plate for selectively holding the tension devices at different distances from said spongy head piece to accommodate snells of different lengths and to yieldingly hold the fishing hooks in the spongy head piece, and means integral with the body plate and spaced from said slots for engaging said first anchoring hooks of the tension devices when released from the snells to hold the tension devices from dangling from the plate.

7. A holder for snelled fishing hooks comprising, a flat body plate having transverse rows of slots across one end portion with the rows of slots spaced apart at different distances from the adjacent end of the plate, a spongy head piece secured across the opposite end portion of the plate, and a plurality of tension springs having hooks on opposite ends, said spongy head piece being adapted to receive therein the points of fishing hooks and the hooks on one end of the tension devices being adapted to engage with the snells of the fishing hooks, the hooks on the other ends of the tension devices being adapted for selective engagement through said slots of the plate to hold the snells taut and the fishing hooks in the head piece irrespective of the different lengths of the snells, each of said last named hooks being an integral part of its tension device.

HENRY E. COLLINS.